Patented Mar. 11, 1930

1,750,551

UNITED STATES PATENT OFFICE

GEORG FRIEDRICH UHDE, OF BOVINGHAUSEN, GERMANY

METHOD FOR SYNTHETICALLY PRODUCING AMMONIA FROM ITS ELEMENTS

No Drawing. Application filed June 30, 1927, Serial No. 202,747, and in Germany July 2, 1926.

My invention relates to the production of ammonia from its elements and has for its particular object means which allow the formation of ammonia to occur under more favorable conditions than in other processes hitherto devised.

It has already been proposed to produce ammonia from its elements by contacting a gaseous hydrogen-nitrogen mixture with a catalyst made from iron, carbon and aluminium, this composition being prepared by causing reaction of an iron salt solution containing an aluminium salt with an iron-cyanogen solution and heating the precipitated compound. Experience has shown that the catalytic efficiency of this compound is low, especially at low temperature and under a moderate pressure.

The present invention contemplates using for the synthetical production of ammonia catalysts which, besides aluminium, carbon and iron also contain nitrogen and an alkali forming metal or a compound thereof. Catalysts answering this description have proved to be of great efficiency and stability more especially at low temperatures and moderate pressures. Amongst the alkali forming metals potassium and its compounds have been found to possess the highest efficiency.

It has further been found that the best results are obtained with catalysts in which potassium is combined with cyanogen or a combination of cyanogen and iron. For instance a combination of an aluminium salt and iron cyanide is used. In order to render this combination fit for use as a catalyst, it must be preformed by heating it in the converter at a moderate temperature, preferably under pressure, in a current of hydrogen or of a mixture of hydrogen and nitrogen.

An efficient catalyst is also obtained, if besides iron cyanide another iron salt is added to the combination.

In practising my invention I may for instance proceed as follows:

A solution of an aluminium salt, for instance aluminium chloride or aluminium sulfate, is mixed with a solution of potassium ferro cyanide in the proportion of 1:1, 2. The mixture is evaporated to dryness in vacuo under continuous-stirring and, if necessary, the drying procedure is gone through repeatedly. The completely dried composition is now introduced in the form of a powder into the converter and first heated at a temperature ranging between about 300 and 450° C. with hydrogen or a mixture of hydrogen and nitrogen, preferably under pressure, whereafter the composition is ready for use as a catalyst in the production of ammonia, care being, however, taken to avoid the presence of oxygen or moisture in the gases treated.

By conducting a mixture of hydrogen or nitrogen over a catalyst prepared as above described at a pressure of 100 atm. and a temperature of about 400° C. up to 20 per cent by volume ammonia were recovered from the gas mixture thus treated.

The potassium compounds in the catalyst may be partly or altogether replaced by compounds of other alkali forming metals, but catalysts containing potassium compounds have been found to be most suitable.

The catalysts prepared according to the present invention have been found to retain their efficiency for a long time, provided that they are subjected to temperatures ranging between 350 and 450° C., but not beyond this point. If the efficiency of the catalyst should drop, it may be restored by disintegrating and pulverizing it.

Various changes may be made in the details disclosed in the foregoing specification without departing from the invention or sacrificing the advantages thereof.

I claim:

1. In the process of synthesizing ammonia from a gaseous nitrogen-hydrogen mixture, the step which comprises contacting the gaseous mixture with a catalyst comprising a complex cyanide containing combined alkali-metal, aluminum and iron.

2. In the process of synthesizing ammonia from a gaseous nitrogen-hydrogen mixture, the step which comprises contacting the gaseous mixture with a catalyst comprising a complex cyanide containing combined potassium aluminum and iron.

3. In the process of synthesizing ammonia from a gaseous nitrogen-hydrogen mixture, the step which comprises contacting the gaseous mixture with a catalyst comprising a complex alkali metal-aluminum-iron cyanide.

4. In the process of synthesizing ammonia from a gaseous nitrogen-hydrogen mixture, the step which comprises contacting the gaseous mixture with a catalyst comprising a complex potassium-aluminum-iron cyanide.

5. In the process of synthesizing ammonia from a gaseous nitrogen-hydrogen mixture, the step which comprises contacting the gaseous mixture with a catalyst comprising the dried reaction product of reacting potassium ferro cyanide with an aluminum salt.

6. In the process of synthesizing ammonia from a gaseous nitrogen-hydrogen mixture, the step which comprises contacting the gaseous mixture with a catalyst comprising the dried reaction product of reacting more than one equivalent of potassium ferro-cyanide with an equivalent of an aluminum salt.

7. In the process of synthesizing ammonia from a gaseous nitrogen-hydrogen mixture, the step which comprises contacting the gaseous mixture with a catalyst comprising the dried reaction product of reacting about one equivalent weight of an aluminum salt and 1.2 equivalent weights of potassium ferro-cyanide.

8. In the process of synthesizing ammonia from a gaseous nitrogen-hydrogen mixture, the step which comprises contacting the gaseous mixture with a catalyst comprising the dried and gasified reaction product of reacting an alkali metal ferro-cyanide with an aluminum salt, gasification thereof being carried out with at least one of the constituents of the nitrogen-hydrogen mixture.

Dated at Berlin this 27th day of May, 1927.

GEORG FRIEDRICH UHDE.